Patented Oct. 16, 1923.

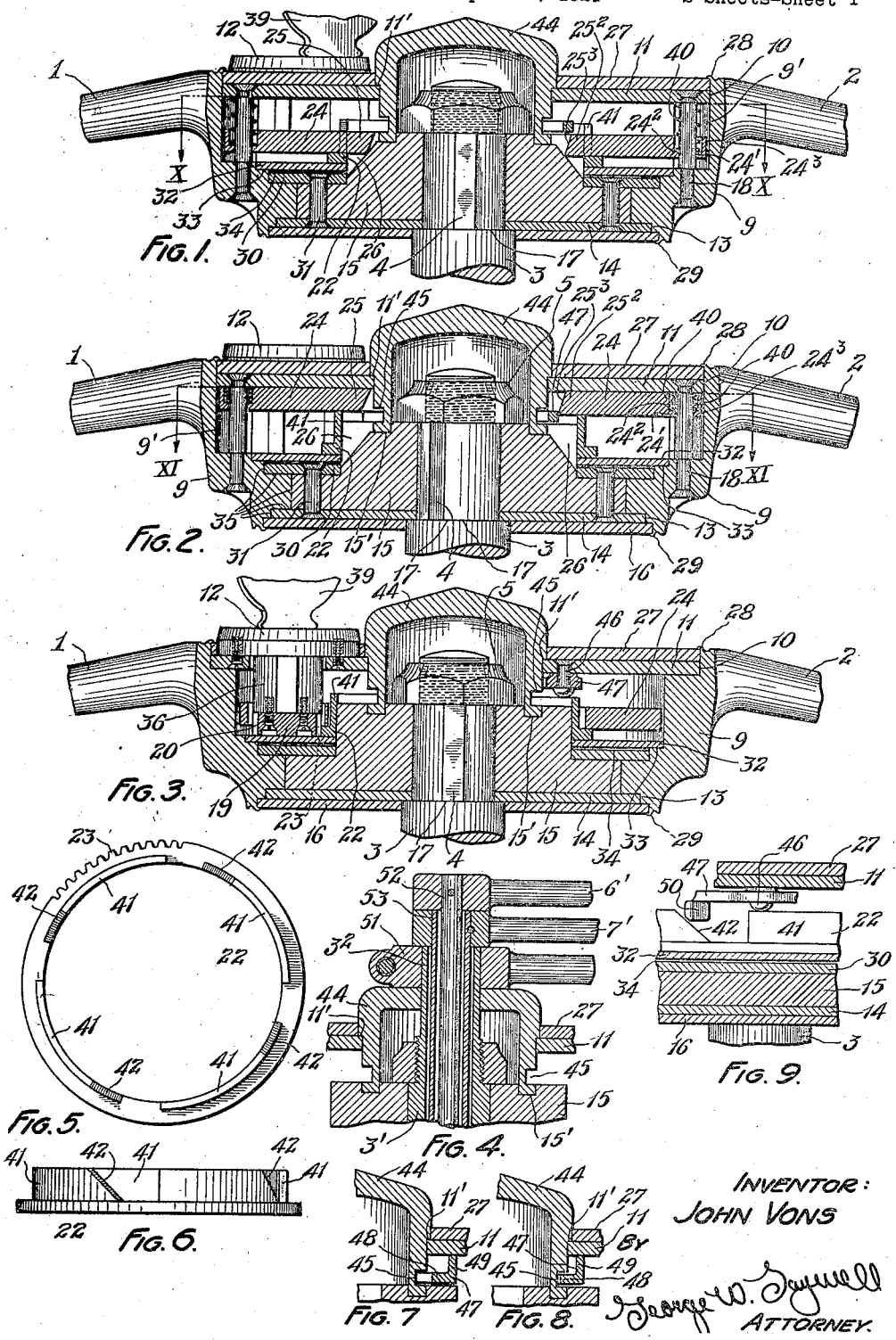

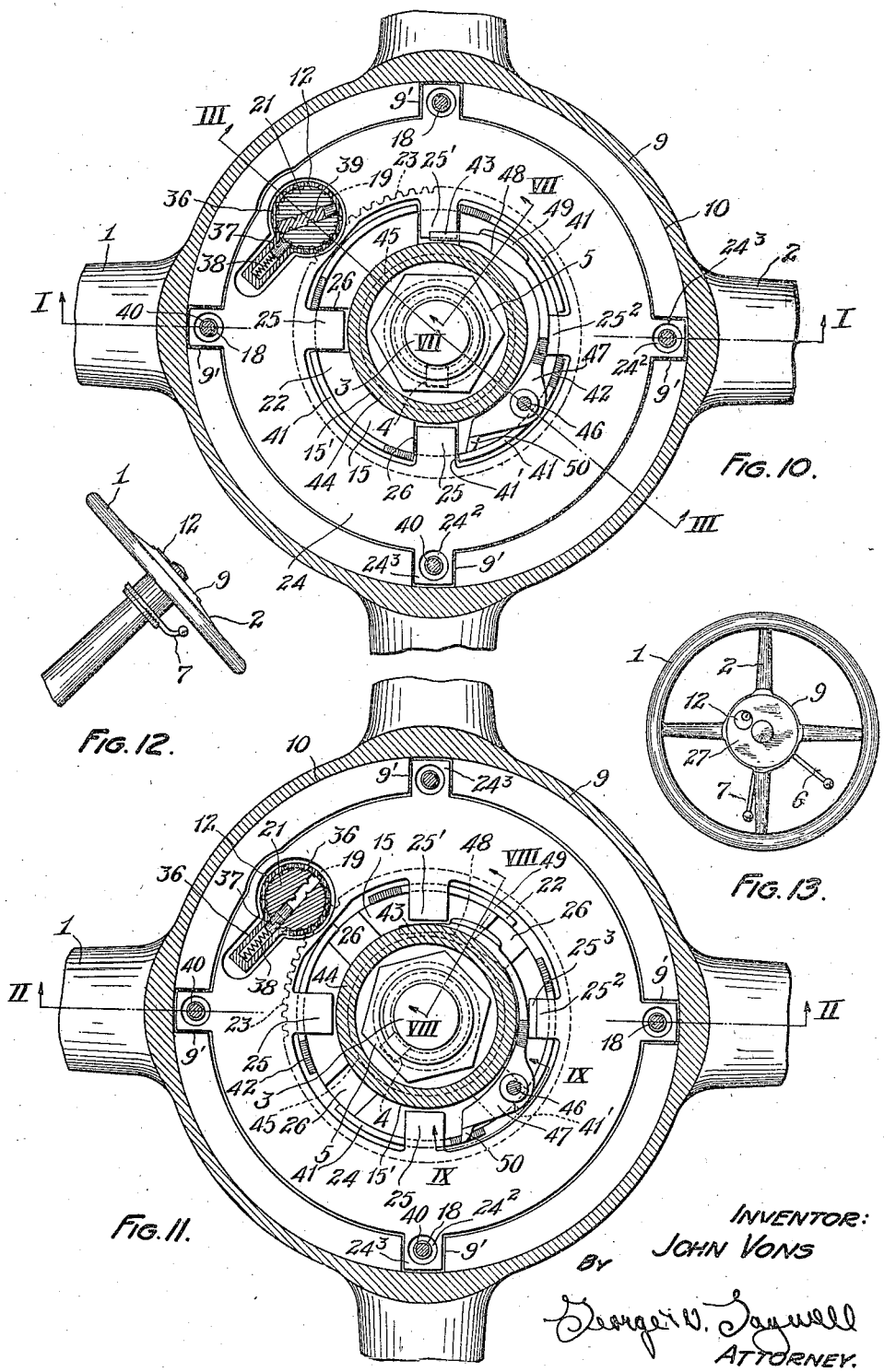

1,470,784

UNITED STATES PATENT OFFICE.

JOHN VONS, OF LAKEWOOD, OHIO.

STEERING WHEEL.

Application filed September 12, 1921. Serial No. 499,999.

*To all whom it may concern:*

Be it known that I, JOHN VONS, a citizen of the United States, resident of Lakewood, county of Cuyahoga, and State of Ohio, have invented new and useful Improvements in Steering Wheels, of which the following is a specification, the principle of the invention being herein explained and the best mode in which I have contemplated applying that principle, so as to distinguish it from other inventions.

My invention relates to wheel locks, and particularly to key-operated apparatus of this character designed for use with the steering wheels of automobiles. The invention is designed to provide means of this character which shall be economical, quickly and easily operated by an authorized person, difficult to operate by one not so authorized, and which cannot readily be put out of commission.

The annexed drawings and the following description set forth in detail certain means embodying my invention, the disclosed means, however, constituting but one of the various mechanical forms in which the principle of the invention may be employed.

In said annexed drawings:

Figure 1 represents a vertical section of my invention, taken in the plane indicated by the line I—I, Figure 10, and showing the several elements of my improved lock in the positions which they occupy when the steering wheel is operative;

Figure 2 is a view similar to Figure 1 of the parts when the steering wheel is inoperative;

Figure 3 is a vertical section, taken in the plane indicated by the line III—III, Figure 10, the several parts being relatively so adjusted that the steering wheel is operative;

Figure 4 is a fragmentary vertical section showing a modified construction utilized when the control levers of the automobile are differently disposed than those utilized with the assembly shown in Figures 1, 2 and 3;

Figures 5 and 6 represent, respectively, a plan view and a side elevation of a lifting cam forming one of the elements of my improved lock;

Figures 7 and 8 represent fragmentary vertical sections through one end of a locking pawl forming one of the elements of my lock, the same being taken, respectively, in the planes indicated by the line VII—VII, Figure 10 and the line VIII—VIII, Figure 11;

Figure 9 represents a fragmentary vertical section showing the other end of said locking pawl, the same being taken in the plane indicated by the line IX—IX, Figure 11;

Figures 10 and 11 represent plan sections, taken in the respective planes indicated by the line X—X, Figure 1 and the line XI—XI, Figure 2; and Figures 12 and 13 represent, respectively, a side elevation and a plan view, upon a smaller scale, of a steering wheel equipped with my improved lock.

Referring to the annexed drawings, in which the several elements are designated by the same respective ordinals in the different views, a conventional steering wheel is indicated by the ordinal 1 having spider arms 2 by which my improved lock is mounted upon the steering post 3. Certain elements of the lock, hereinafter fully described, are rotatably secured to the post 3 by means of a key 4. A nut 5, and a shoulder 17 formed upon the steering post 3, retain the lock against relative longitudinal displacement. Conventional gas and spark levers are indicated by the ordinals 6 and 7.

The inner ends of the spider arms 2 are formed integral with a hub member 9, having a recess 10 in its top face adapted to receive a plate 11 upon which, and adjacent one side, is secured a lock 12. The bottom face of the hub member 9 is formed with a second recess 13 receiving a plate 14 secured to a central casting 15 forming one of the elements of my improved lock, the plate 14 being supported upon the enlarged portion 17 of the steering post 3 and the casting 15 being formed with a key-way co-operating with the key 4. It will be apparent, therefore, that the central casting member 15 of the lock is rotatably fixed to the steering post 3. Both the upper plate 11 and the lower plate 14 are covered by exterior hardened plates 16 and 27, respectively, said plates 16 and 27 being rigidly secured within the hub member 9 by means of spinning over the upper and lower edges 28 and 29, respectively, of said hub member, as plainly shown in Figures 1, 2 and 3. The plate 11 is rigidly secured to the hub member 9 by means of rivets 18, these rivets intersecting holes 24' formed in outwardly extending lugs 24³ of the ring member 24, which lugs 24³ register with vertical slots 9' formed in the inner face of the hub member 9.

It is evident from the foregoing description that, if means operated by the lock 12 be provided for selectively rotatably securing together the casting 15 or parts attached thereto, and the hub member 9 or parts attached thereto, or freeing said casting and hub member rotatably one from the other, the steering wheel 1 will, when turning, actuate the steering post 3 or will turn free about said steering post. These means will now be described and consist generally in a pinion 19 secured to the stem 21 of the lock 12 by means of screws 20, a cam member 22 having a gear segment 23 adapted to co-operate with the pinion 19, and an intermediate vertically movable ring member 24 having inwardly extending locking lugs 25 adapted to be moved into or out of vertical recesses 26 formed in the casting 15. A ring 30 is secured by means of rivets 31 to the casting 15 and an auxiliary ring 32 lies upon a shoulder 33 formed in the hub member 9, said ring 32 lying above the ring 30 and spaced therefrom by a slight clearance indicated by the ordinal 34. The purpose of this auxiliary ring 32 and the clearance area 34 is to assure the positive movement of the cam element 22 with the ring 24, in the unlocked condition of the mechanism, so that the cam and ring may not be inadvertently relatively moved to bring the lugs 25 and recesses 26 into registry and thus result in the operative condition of the lock. It will be noted, then, that the relatively moving and contacting surfaces, when the wheel 1 is turning free of the steering post 3, are the several surfaces denoted by the ordinal 35, Figure 2.

The detailed construction of the elements 19, 22 and 24, together with the construction of some other parts co-operating therewith, for effecting the rotatable engagement and disengagement of the wheel 1 and steering post 3, is as follows: the lock 12 is formed with the usual barrel 36, tumblers 37 normally actuated by the springs 38, and the key 39 for actuating the tumblers 37 inwardly against the tension of the springs 38. When the lock 12 is locked, as shown in Figure 11, the parts of my wheel lock are in their relative free positions so that the wheel 1 turns independently of the steering post 3. When the lock 12 is turned by the key 39 to the position shown in Figure 1, the cam 22 is turned by means of the pinion 19 and the gear segment 23 so that the recesses 26 lie immediately below the inwardly extending lugs 25, whereby, under the action of coil springs 40 abutting the plate 11 at their upper ends and bearing at their lower ends upon shoulders 24² formed in the ring member 24 and intersecting the holes 24', the ring member 24 is forced downwardly into the position shown in Figure 1 and, consequently, the casting 15 which is secured to the steering post 3 is rotatably secured to the ring 24 which is rotatably secured to the steering wheel 1. Positive means 43, which will be hereinafter fully described, are also provided for holding the ring 24 down in the locking position shown in Figure 1. When the key 39 is actuated so as to turn the lock 12 into the position shown in Figure 11, the cam 22 by means of bevel surfaces 42 formed upon four cam segments 41, lifts the ring 24, through pressure upon the inwardly extending lugs 25, to the position shown in Figure 2, the gear members 19 and 23 and the lock 12 being so formed that the segments 41 then move a certain distance horizontally of said lugs, as shown in said Figure 2, and then support the ring 24 in the upper position so that the lugs 25 are free of the recesses 26 and the casting 15 is not actuated to turn the steering post 3 when the steering wheel 1 is turned.

In order that, after the aforedescribed elements have been assembled upon the steering post 3, these elements may not be readily disturbed through the removal of the nut 5, I provide means consisting of a cap 44 and associated elements for protecting said nut 5. This cap 44 snugly fits the hardened plate 27 and rests upon a shoulder 11' formed in the plate 11 and is mounted in an annular groove 15' formed in the upper surface of the casting 15. Exteriorly of this cap 44, and in the lateral face thereof, is formed a groove 45 adapted to receive a portion 48 of a locking pawl 47 pivoted adjacent one of its ends upon a rivet 46 secured in the plate 11, as plainly shown in Figure 3. The means 43 for positively locking the ring 24 in the operative position of the mechanism, and heretofore mentioned, consists in an elongated end portion formed upon the locking pawl 47, as plainly shown in Figure 10, which overlaps one of the inwardly extending lugs of the ring 24, said lug being indicated by the ordinal 25', Figures 10 and 11. The locking portion 48 of the pawl 47 is actuated inwardly and outwardly of the annular groove 45 in order to lock and unlock the cap 44. When the mechanism is in its operative position, i. e., when the operator is present at the wheel and can therefore watch the car, the locking portion 48 of the locking pawl 47 is in its free position and, when the mechanism is in its inoperative position, i. e., when the car is left unattended, the locking portion 48 of the pawl 47 is in its closed position. The means for actuating the pawl 47 to closed position consist in a downwardly beveled face 25³ formed upon one of the inwardly extending lugs 25 designated particularly by the ordinal 25², so that as the ring 24 is lifted to its upward position, shown in Figure 2, said lug 25² will force the long arm of the pawl 47 into the closed position shown in Figure 11. The means for opening the pawl 47 are provided by so arranging the cam 22 that a lateral face 41', Figure 10, of one of the upwardly extending cam segments 41, will contact a tail piece 50 formed upon the short arm of the pawl 47, when the cam 22 is being turned so as to lock the mechanism, whereby the pawl 47 is turned upon the pivot pin 46 to unlock the portion 48 of the pawl 47, as shown in Figure 10.

Due to the fact that the groove 45 is formed in the cap 44 some distance below the plane of the plate 11, and in order that the pawl 47 may still be guided by the lower face of the plate 11, the long arm of the pawl 47 is angular in cross-section consisting of an upwardly extending guiding portion 49 and a horizontally extending locking portion 48, plainly shown in Figure 8.

The construction hereinbefore described presupposes an assembly of steering wheel, gas and spark levers, etc., as shown in Figure 13. However, when the gas and spark levers extend upwardly beyond the post 3, as shown in Figure 4, wherein a segment 51 is shown mounted upon an upwardly extending portion 3² of the post 3', and the gas and spark levers 6' and 7' are shown mounted upon concentric upwardly extended members 52 and 53, respectively, the construction and assembly of the cap 44 and associated elements will be such as are plainly shown in said Figure 4 in order to come within the spirit of my invention.

I claim as my invention:

1. An automobile steering wheel comprising, a wheel proper having a hub; a lock supported by said hub; a steering post; a member rotatably fixed to said steering post and having a plurality of peripheral vertical recesses with open tops; an annular member formed with an upwardly-extended flange having spaced open-top recesses and upper cam surfaces alternating with said recesses; key-operated means for rotating said annular member; and a vertically-movable member secured to said hub and having locking members adapted to engage the first-mentioned recesses, the locking members of said vertically-movable member being adapted to be moved by said cam surfaces to and from said flange and out of and into said second-mentioned recesses.

2. An automobile steering wheel comprising, a wheel proper having a hub; a lock supported by said hub; a steering post; a member rotatably fixed to said steering post and having peripheral vertical recesses with open tops; a cover plate fitted within said hub, said plate, said rotatable member and said hub providing an enclosed chamber; an annular member supported in said chamber and formed with an upwardly-extended flange having spaced open-top recesses and upper cam surfaces alternating with said recesses; key-operated means for rotating said annular member; a second annular member having inwardly-extending locking members adapted to engage the first-mentioned recesses, said last-mentioned annular member being vertically movable in said chamber, said locking members intersecting said second-mentioned recesses, said second-mentioned annular member having also outwardly-extended ears formed with enlarged holes; bolts secured to said plate at their top ends and to said hub at their bottom ends and intersecting said holes; and means normally holding said last-mentioned annular member in its lowermost position.

3. An automobile steering wheel comprising, a wheel proper having a hub; a cover plate secured within said hub; a steering post; a central member rotatably fixed to said steering post; a cap extended through and upwardly of said plate; means secured within the hub and below said plate for locking and unlocking said cap; and key-operated means adapted to actuate the cap-locking means and to lock and unlock said hub and said central member.

Signed by me this 6th day of September, 1921.

JOHN VONS.